United States Patent Office 3,415,771
Patented Dec. 10, 1968

3,415,771
COATING COMPOSITIONS AND PROCESSES
Robert Wilson Woodruff, East Brunswick, N.J., assignor to E. I. du Pont de Nemours and Company, Wilmington, Del., a corporation of Delaware
No Drawing. Filed May 21, 1965, Ser. No. 457,836
5 Claims. (Cl. 260—33.4)

ABSTRACT OF THE DISCLOSURE

A coating composition comprising:
(1) a dispersion of inert inorganic particles comprising particles 8–20 microns in size and particles below 0.5 micron in size, there being about 2 to about 2.5 times by weight more small size particles than large size particles in
(2) a solution of alkanol of 1–4 carbons or an aliphatic hydrocarbon of 5–10 carbons, containing
(3) an organic polymer containing a hydroxyl or amide group, and
(4) a cationic ammonium salt dispersing agent. Also a process of coating an opaque, microporous non-fibrous clear image-bearing layer of an addition polymer with the composition to form a matte surface.

---

This invention relates to coating compositions for treating opaque, porous, clear, image-bearing transparencies and to processes for treating such transparencies.

It is an object of this invention to provide a novel coating composition for protecting the surface of an opaque, microporous, pressure-clearable, hydrophobic, addition polymer layer containing a clear image. Another object is to provide such a composition that will protect the surface of such an image-bearing layer when in contact with the surface of a photopolymerizable printing element. A related object is to provide such a composition that will not have a deleterious action when used in such an image-bearing layer to expose a photopolymerizable printing plate. Still further objects will be apparent from the following description of the invention.

The novel coating composition of this invention comprises:
(1) A dispersion of a mixture of (a) inert inorganic particles having a mean particle size between 8 and 20 microns and (b) such particles of markedly smaller size and having a mean particle size below 0.5 micron, preferably silica, in
(2) A solution of a volatile solvent selected from the group consisting of an alkanol of 1–4 carbon atoms, and aliphatic hydrocarbons of 5 to 10 carbon atoms, preferably between 6 to 8 carbon atoms, containing
(3) Organic polymer of average molecular weight greater than 5,000 containing hydroxyl or amido groups selected from the group consisting of polyvinyl alcohol, polyvinyl pyrrolidone, poly(vinyl pyrrolidone/vinyl acetate); alcohol-soluble nylons (polyamides) and polyamides of dimerized linoleic acid.

Particles (a) can be present in amounts of 0.04% to 2%, and particles (b) can be present in amounts of 0.1% to 2%, by weight.

The process of the invention comprises
(a) Coating the surface of an opaque, microporous, non-fibrous pressure-clearable clear image-bearing layer of a hydrophobic organic addition polymer (including a copolymer) of at least one ethylenically unsaturated monomer selected from the group consisting of vinyl and vinylidene monomers having a wholly carbon chain and a molecular weight of at least 10,000 with a coating composition as set forth in the preceding paragraph; and
(b) Evaporating said solvent to form a matte surface protective coating on said image-bearing layer.

The coating solution preferably contains silica particles of different sizes. Large size particles, termed "matting agent," are chosen to hold the photopolymer plate away from the negative in sufficient regions so that vacuum pumping, termed "air bleeding," can be maintained during exposure. Small size silica particles, termed "release agent," are used (i) to prevent any intimate contact of the flat surfaces, thereby allowing ready release of the negative from the photopolymer plate after completion of the exposure, and (ii) to prevent agglomeration of the larger particles during storage of the coating solution. To obtain satisfactory release it has been shown that about 2 to 2½ times by weight more small size silica particles are needed than large size silica particles. It has also been shown that the average diameter of the large size silica particles must be at least 10 times greater than the average diameter of the small size silica particles.

Various pressure-sensitive conversion films can be treated with the coating compositions of this invention. Suitable films are described in Bechtold U.S. Patents 2,957,791, 2,846,727, 2,848,752, and assignee's Bechtold U.S. application Ser. No. 63,953, filed Oct. 21, 1960 (U.S. Patent 3,149,967, Sept. 22, 1964).

The pressure-sensitive conversion films described in the foregoing patents and applications have also been called opaque pressure-clearable or pressure-clarifiable or pressure-coalescible films. Whatever the nomenclature, the film has opaque surface areas which are converted by means of pressure into clear areas readily transparent to visible light. The films are also clearable by heat and by heat and pressure.

The pressure-sensitive conversion films or coatings of the Bechtold patents which constitute preferred materials for use in this invention are porous, opaque, non-fibrous, of low bulk density and are composed of partially coalesced discrete particles of a hydrophobic organic addition polymer having a wholly carbon chain, a molecular weight of at least 10,000 and being taken from the group consisting of vinyl and vinylidene addition polymers, said film having an open-cell structure characterized by microscopic voids communicating with the surface and containing 20% to 80% by volume of open-cell pores, said film having a permeability to water vapor of at least 10 times greater than that of corresponding non-porous films of the same polymer and thickness, the opacity per unit of thickness being such that a film thickness of 3 mils and greater has a light-transmission of less than 10% at 4000 A., and increased light transmission at longer wavelengths of light, said film being capable of sustaining a permanent reduction in thickness of at least 20% together with substantial clarification of opaqueness under a pressure of 10,000 pounds per square inch at room temperature. These films are more fully described and defined in Bechtold U.S. Patent 2,957,791 which constitutes part of this disclosure.

In Bechtold U.S. Patent 2,957,791 methods are described for selectively clarifying the pressure-sensitive conversion films covered by said patent that include pressing the films against a copper engraving, and placing the film in a typewriter, without an inking ribbon, and typing directly on it. The pressure-clearable films can be placed against type in a proofing press, and the roller passed over the type to produce a clear image of the type in the film. The resultant clear image-bearing elements can then be used as negatives for photoprinting.

The impressing of relief images against pressure-sensitive, conversion film is accomplished by equipment such as is described in Halpern et al. U.S. Patent 3,113,342, Alles U.S. Patent 3,118,178, Alles U.S. Patent 3,128,497, Alles U.S. Patent 3,128,498, Nacci et al., U.S. Patent 3,179,975 Apr. 27, 1965, and assignee's Halpern U.S. applications Ser. No. 101,981 filed Apr. 10, 1961 (U.S. Patent 3,244,777 Apr. 5, 1966) and Ser. No. 263,800 filed Mar. 8, 1963 (U.S. Patent 3,243,843 Apr. 5, 1966), and corresponding British patent specification No. 944,980 filed Apr. 18, 1964. In general, image formation may be attained by any machine that forms clear images in the film by pressure contact with relief printing forms, e.g., type matter, and/or halftones.

After the clarified, or clear, images are formed in the pressure-sensitive conversion films by hand tools or by use of machines, the opaque background areas can be increased in optical density by deposition of opaque material in such areas to provide a high-contrast image-bearing layer. These areas being porous are readily coated or impregnated with colorants which fill the open cell voids. Any of the post-densification procedures described in assignee's Bechtold U.S. Patent No. 3,149,967 Sept. 22, 1964, and in assignee's Cline U.S. application Ser. No. 176,814, Mar. 1, 1962 (U.S. Patent 2,290,149, Dec. 6, 1966), can be used. Thus, the selectively clarified coating can be post-densified in unchanged opaque background areas by in situ deposition of lead sulfide at 50° C. by immersing the coating in aqueous lead nitrate and sodium sulfide solutions with intermediate blotting with porous cardboard, washing in water and drying which gives a dense, black background. There can be opacification by "in situ" deposition of not only lead sulfide as described above but by Prussian blue, chromates and water soluble dyes. Optical densities up to 4.5 are obtainable in many cases as measured by a Welch densichron. Alternatively, the background areas can be post-densified by dyeing for several minutes with 2.5% aqueous solution of an after-chromed dye, Colour Index No. 15,710 at 50° C.

Photopolymerizable elements useful for making photopolymer printing plates are described in Plambeck U.S. Patent 2,760,863 and Burg U.S. Patent 3,036,913. The photopolymerizable composition can be a mixture of cellulose acetate, hydrogen succinate, triethylene glycol diacrylate, anthraquinone, and an inhibitor. Other photopolymerizable compositions of the types described in Plambeck U.S. Patent 2,760,863 can also be used to form solid photopolymerizable layers. Suitable other compositions are described in Italian Patent 568,225, Oct. 25, 1967, and in U.S. patents: Martin 2,892,716, June 30, 1959; Martin, 2,902,365, Sept. 1, 1959; Martin, 2,927,023, Mar. 1, 1960; Martin, 2,929,710, Mar. 2, 1960; Martin, et al. 2,927,022, Mar. 1, 1960; McGraw, 3,024,180, Mar. 6, 1962; Saner et al., U.S. application Ser. No. 638,395, filed Feb. 5, 1957 (abandoned). In the photopolymerizable layers of the photopolymerizable elements, i.e., there can be used practically any initiator of addition polymerization that is capable of initiating polymerization under the influence of actinic light.

The base supports for the photopolymerizable elements of the photopolymer plates can be flexible and composed of metal, e.g., aluminum or steel, or they can be rigid. Also, they can be made of various film-forming resins or polymers. Suitable supports of these types are disclosed in U.S. Patent 2,760,863, col. 5, lines 14–75, and col. 6 lines 1–15.

There are various processes for transferring images using the various photopolymer plates, among which are the methods disclosed in Burg U.S. Patent 3,060,023, Burg U.S. Patent 3,060,024, Burg U.S. Patent 3,060,025 and Heiart U.S. Patent 3,060,026.

Polymers or copolymers that are useful in the coating composition of this invention:

(a) Should be soluble in alkanols of 1–4 carbons and/or aliphatic hydrocarbons of 5–10 carbons.

(b) Should not clarify the pressure-sensitive, conversion film, (c) Should dry quickly, (d) Should form stable dispersions in solution with silica, and (e) After being dried, should be impervious to plasticizer and/or monomer in photopolymerizable layers.

The coating dispersion can be applied in any suitable manner. The preferred method of application consists of either coating by dipping, rolling or doctoring, or by spraying the coating dispersion on the pressure-sensitive conversion film.

The solvent for the polymer used in the coating dispersion namely the alcohol or non-aromatic hydrocarbon should not clarify the pressure-sensitive film during application or drying of the coating. A volatile solvent is preferred so that drying times of one minute or less can be obtained. Toxicity and evaporating times must be considered in obtaining practical alcohol or non-aromatic hydrocarbon solvents. The most preferred solvent was found to be ethanol because of its solvent power. It dissolves the preferred coating polymers yet does not clarify the pressure-sensitive film, and has low toxicity and evaporates rapidly. Preferably the solvent used should be non-toxic because the coating will usually be applied in open rooms.

An aqueous solvent has the disadvantage of drying too slowly, and uniform application is difficult.

When the pressure-sensitive conversion film negative is held against the photopolymer printing plate, the negative surface is damaged by plasticizing monomers and mobile plasticizers which have exuded from the photopolymer plate. A protective coating on the surface of the negative must therefore be impervious to the plasticizing monomers and mobile plasticizers. The poly(vinyl pyrrolidone/vinyl acetate) copolymer forms a coating which plasticizer and/or monomer will not penetrate.

Plasticizing monomers and mobile plasticizers that will damage the uncoated pressure-sensitive film include common ester plasticizers and analogous polymerizable unsaturated esters of polyols, particularly such esters as the alphamethylene carboxylic acids, e.g., ethylene diacrylate, diethylene glycol diacrylate, triethylene glycol diacrylate, polyethylene glycol diacrylate where the number of monomeric units is from 4 to 10, glycerol diacrylate, glycerol triacrylate, mannitol polyacrylate, sorbitol polyacrylates, ethylene dimethacrylate, 1,3,propanediol dimethacrylate, 1,2,4-butanetriol trimethacrylate, 1,4-cyclohexanediol diacrylate, 1,4-benzenediol dimethacrylate pentaerythritol di-, tri- and tetramethacrylate, dipentaerythritol, polyacrylate, pentaerythritol di-, tri-, and tetraacrylates, 1,3-propanediol diacrylate, 1,5-pentanediol dimethacrylate, the bis-acrylates and methacrylates of polyethylene glycols particularly of molecular weight below 1500, and the like; vinyl esters such as divinyl succinate, divinyl adipate, divinyl phthalate, divinyl terephthalate, divinyl benzene-1,3-disulfonate, and divinyl butane-1,4-disulfonate; and unsaturated aldehydes such as sorbaldehyde (hexadienal).

The invention will be further illustrated by but is not limited to the following illustrative examples wherein the amounts and percentages are by weight.

EXAMPLE I

The following ingredients were combined, with stirring, in the order of listing:

| | | |
|---|---|---|
| Ethyl alcohol | ml | 60.0 |
| Formulation A | grams | 2.0 |
| Formulation B | do | 2.0 |
| Formulation C | do | 4.0 |
| Poly(vinylpyrrolidone/vinyl acetate) 50/50 ratio by weights) | grams | 90.0 |

The composition of Formulation A is 3% by weight n-hexadecyl trimethylammonium chloride; 46.5% by weight n-octadecyl trimethylammonium chloride; 0.5% by weight n-octadecenyl trimethylammonium chloride; 1% by weight sodium chloride; 36% by weight isopropyl alcohol; 13% by weight water. Formulation B is composed of finely divided silica, with an average particle size of 10 microns, in the form of a dry powder. Formulation C has a silica content of 95% by weight on a moisture-free basis, an average particle size of 0.01 micron, and is in the form of a dry powder.

The solution was ball milled with glass balls for 24 hours. The milled solution was diluted with sufficient ethyl alcohol to obtain a matting solution which contained the following constituents in the indicated amounts:

| | Percent |
|---|---|
| Ethyl alcohol | 94.7 |
| Formulation A | 0.2 |
| Formulation B | 0.2 |
| Formulation C | 0.4 |
| Poly(vinylpyrrolidone/vinyl acetate) 50/50 ratio by weights) | 4.5 |

When the matting solution was allowed to stand for a time there was some settling of the silica, but this was readily returned to suspension with shaking.

A pressure-sensitive film comprised of an opaque, pressure-coalescible, porous copolymer of vinyl chloride and methyl acrylate (75/25 monomer charge weight ratio) on a thin, dimensionally-stable, polyethylene terephthalate base, and an antistatic layer of a higher aliphatic amine, was pressed with a metal type-form to give a clarified image in the film corresponding to the raised portions of the type. The clarified film was placed coated side up on a flat support. A very soft-bristle brush was saturated with a solution of nigrosine dye in water with a surfactant and/or alcohol and used to spread the solution over the film surface. A method of making water soluble nigrosine dyes is given at C.I. 50420, Colour Index, 2nd edition.

The dye solution was reapplied where necessary to penetrate through the porous layer. The excess was squeegeed off with a soft rubber squeegee. Stabilizing solution of aluminumsulfate in water was applied with a saturated sponge immediately to keep the surface from becoming dry. A slight scrubbing action with the sponge removed any dye adhering to the film. The film remained covered with stabilizer for 30 seconds. (Note: The period of time that the stabilizer can be left in the film has a wide range; e.g., a few seconds to an hour or so.) The film was then rinsed with water and allowed to dry in air which took less than 5 minutes. The finished negative consisted of dye deposited only in the uncoalesced porous areas of the film with a large difference in optical density between these areas and the areas clarified by the type form. A negative had been prepared by a non-photographic process.

The matting solution was sprayed onto the image face of the negative. The coating was allowed to dry for one minute.

The negative was placed in contact with a photopolymer plate, which is described in Burg U.S. Patent 3,036,913, in a vacuum frame for exposure of the plate. The photopolymer plate is comprised of (I) a support, (II) a solid photopolymerizable layer comprising an organic polymeric binder, and ethylenically unsaturated monomer capable of forming a high polymer by photoinitiated photopolymerization, and an addition polymerization initiator activatable by actinic light and thermally inactive at 185° C. and below, and (III), between (I) and (II) and in surface contact with (II), an anchor layer of an adhesive composition. A vacuum was applied to the interface region of the negative and the photopolymer plate. The plate was exposed by means of a carbon arc so that a base plate temperature of 30° C. and a photopolymer plate surface temperature of about 45° C. were obtained. The exposed photopolymer plate and negative were separated, and the exposed photopolymer plate was processed to obtain a finished photopolymer printing plate. A good image was obtained in the final plate which was suitable for letterpress printing and copies obtained therefrom had excellent detail and quality.

The negative was in good condition and did not show signs of peeling off onto the exposed photopolymer plate, or of clarifying in the non-imaged areas. The protective coating appeared to have rendered the negative impervious to any plasticizing monomer or mobile plasticizer exuding from the exposed photopolymer plate. After several more successive exposures no defects were observed in the negative. This protective coating composition rendered the best results of any tested. A control negative without the protective coating showed severe blistering, peeling and sticking which also damaged the photopolymer plate surface.

EXAMPLE II

A matting solution was prepared which contained the following constituents:

| | Percent |
|---|---|
| Ethyl alcohol | 94.7 |
| Formulation D | 0.2 |
| Formulation B | 0.2 |
| Formulation C | 0.4 |
| Poly(vinylpyrrolidone/vinyl acetate) (50/50 ratio by weights) | 4.5 |

The matting solution was prepared using the same procedure that is set forth in Example I.

The composition of Formulation D is 4% by weight n-octyl trimethylammonium chloride; 4.5% by weight n-decyl trimethylammonium chloride; 23.5% by weight n-dodecyl trimethylammonium chloride; 9% by weight n-tetradecyl trimethylammonium chloride; 4% by weight n-hexadecyl trimethylammonium chloride; 2.5% by weight n-octadecyl trimethylammonium chloride; 2.5% by weight n-octadecenyl trimethylammonium; chloride 1% by weight sodium chloride; 36% by weight isopropyl alcohol; 13% by weight water.

The matting solution was coated on a dyed negative which was used for exposing a photopolymer plate in a vacuum frame and then the negative was separated from the exposed photopolymer plate, all in the manner described in Example I. The exposed photopolymer plate was processed to obtain a finished photopolymer printing plate.

The negative was in good condition and did not show signs of peeling off onto the exposed photopolymer plate, or clarifying the non-image areas. The protective coating appeared to have rendered the negative impervious to the plasticizer and/or monomer exuding from the exposed photopolymer plate. After several more successive exposures no defects were observed in the negative.

EXAMPLE III

A matting solution was prepared which contained the following constituents:

| | Percent |
|---|---|
| Ethyl alcohol | 94.7 |
| Formulation E | 0.2 |
| Formulation B | 0.2 |
| Formulation C | 0.2 |
| Poly(vinylpyrrolidone/vinyl acetate) (50/50 ratio by weights) | 4.5 |

The matting solution was prepared using the same procedure that is set forth in Example I.

The composition of Formulation E is 4% by weight di-n-octyl dimethylammonium chloride; 4.5% by weight di-n-decyl dimethylammonium chloride; 23.5% by weight di-n-dodecyl dimethylammonium chloride; 9% by weight di-n-tetradecyl dimethylammonium chloride; 4% by weight di-n-hexadecyl dimethylammonium chloride; 5% by weight n-octadecyl trimethylammonium chloride; 0.5% by weight sodium chloride; 42% by weight isopropyl alcohol; 7.5% by weight water.

The matting solution was coated on a dyed negative, the negative was used for exposing a photopolymer plate in a vacuum frame, and then the negative was separated from the exposed photopolymer plate, all in the manner described in Example I. The exposed photopolymer plate was processed to obtain a finished photopolymer printing plate.

The negative was in good condition and did not show signs of peeling off onto the exposed photopolymer plate, or of clarifying in the non-imaged areas. The protective coating appeared to have rendered the negative impervious to the plasticizer and/or monomer exuding from the exposed photopolymer plate. After several more successive exposures, no defects were observed in the negative.

EXAMPLE IV

A matting solution was prepared which contained the following constituents:

| | Percent |
|---|---|
| Ethyl alcohol | 94.7 |
| Formulation F | 0.2 |
| Formulation B | 0.2 |
| Formulation C | 0.4 |
| Poly(vinylpyrrolidone/vinyl acetate) (50/50 ratio by weights | 4.5 |

The matting solution was uprepared using the same procedure that is set forth in Example I.

Formulation F is a cationic, quaternary ammonium antistatic.

The matting solution was coated on a dyed negative the negative was used for exposing a photopolymer plate in a vacuum frame, and then the negative was separated from the exposed photopolymer plate, all in the manner described in Example I. The exposed photopolymer plate was processed to obtain a finished photopolymer printing plate.

The negative was in good condition and did not show signs of peeling off onto the exposed photopolymer plate, or of clarifying in the non-imaged areas. The protective coating appeared to have rendered the negative impervious to the plasticizer and/or monomer exuding from the exposed photopolymer plate. After several more successive exposures no defects were observed in the negative.

EXAMPLE V

A matting solution was prepared which contained the following constituents:

| | Percent |
|---|---|
| Ethyl alcohol | 94.7 |
| Formulation A | 0.2 |
| Formulation B | 0.2 |
| Formulation C | 0.4 |
| Polyvinyl alcohol | 4.5 |

The matting solution was prepared using the same procedure that is set forth in Example I.

The matting solution was coated on a dyed negative, the negative was used for exposing a photopolymer plate in a vacuum frame, and then the negative was separated from the exposed photopolymer plate, all in the manner described in Example I. The exposed photopolymer plate was processed to obtain a finished photopolymer printing plate.

The negative was in good condition and did not show any signs of peeling off onto the exposed photopolymer plate, or of clarifying in the non-imaged areas. The protective coating appeared to have rendered the negative impervious to the plasticizers and/or monomer exuding from the exposed photopolymer plate. After several more successive exposures no defects were observed in the negative.

EXAMPLE VI

A matting solution was prepared which contained the following constituents:

| | Percent |
|---|---|
| Ethyl alcohol | 94.7 |
| Formulation A | 0.2 |
| Formulation B | 0.2 |
| Formulation C | 0.4 |
| Polyvinyl pyrrolidone | 4.5 |

The matting solution was prepared using the same procedure that is set forth in Example I.

The matting solution was coated on a dyed negative, the negative was used for exposing a photopolymer plate in a vacuum frame, and then the negative was separated from the exposed photopolymer plate, all in the manner described in Example I. The exposed photopolymer plate was processed to obtain a finished photopolymer printing plate.

The negative was in good condition and did not show signs of peeling off onto the exposed photopolymer plate, or of clarifying in the non-imaged areas. The protective coating appears to have rendered the negative impervious to the plasticizer and/or monomer exuding from the exposed photopolymer plate. After several more successive exposures no defects were observed in the negative.

EXAMPLE VII

A matting solution was prepared by the procedure of Example I with the following constituents:

| | Percent |
|---|---|
| Ethyl alcohol | 94.7 |
| Formulation A | 0.2 |
| Formulation B | 0.2 |
| Formulation C | 0.4 |
| Alcohol-soluble nylon (consisting of the reaction product of 40% 6-amino-caproic acid, 35% hexamethylenediammonium adipate and 25% hexamethylenediammonium sebacate). | |

The matting solution was coated on a dyed negative, the negative was used to expose a photopolymer plate in a vacuum frame, and then the negative was separated from the exposed photopolymer plate all in the manner described in Example I. The exposed photopolymer plate was processed to obtain a finished photopolymer printing plate.

The negative was in good condition and did not show signs of peeling off onto the exposed photopolymer plate, or of clarifying in the non-imaged areas. The protective coating appeared to have rendered the negative impervious to the plasticizer and/or monomer exuding from the exposed photopolymer plate. After several more successive exposures no defects were observed in the negative.

EXAMPLE VIII

A matting solution was prepared by the procedure of Example I with the following constituents:

| | Percent |
|---|---|
| Ethyl alcohol | 94.7 |
| Formulation A | 0.2 |
| Formulation B | 0.2 |
| Formulation C | 0.4 |
| Polyamide of dimerized linoleic acid | 4.5 |

The polyamide of dimerized linoleic acid was formed as follows:

$$n\text{HOOC} \cdot \text{R} \cdot \text{COOH} + n\text{H}_2\text{NR}' \cdot \text{NH}_2 \rightarrow$$
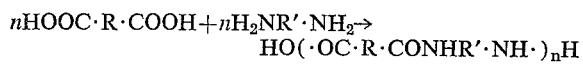

where the polyamine used is ethylene diamine, R is a hydrocarbon group of an indeterminate configuration containing 34 carbon atoms and R' is $-\text{CH}_2\text{CH}_2-$.

The matting solution was coated on a dyed negative, the negative was used for exposing a photopolymer plate in a vacuum frame, and then the negative was separated from the exposed photopolymer plate, all in the manner described in Example I. The exposed photopolymer plate was processed to obtain a finished photopolymer printing plate.

The negative was in good condition and did not show signs of peeling off onto the exposed photopolymer plate, or of clarifying in the non-imaged areas. The protective coating appeared to have rendered the negative impervious to the plasticizer and/or monomer exuding from the exposed photopolymer plate. After several more successive exposures no defects were observed in the negative.

EXAMPLE IX

A matting solution was prepared which contained the following constituents:

| | Percent |
|---|---|
| Methyl alcohol | 94.7 |
| Formulation A | 0.2 |
| Formulation B | 0.2 |
| Formulation C | 0.4 |
| Poly(vinylpyrrolidone/vinylacetate) (50/50 ratio by weights) | 4.5 |

The matting solution was prepared using the same procedure that is set forth in Example I.

The matting solution was coated on a dyed negative, the negative was used for exposing a photopolymer plate in a vacuum frame, and then the negative was separated from the exposed photopolymer plate, all in the manner described in Example I. The exposed photopolymer plate was processed to obtain a finished photopolymer printing plate.

The negative was in good condition and did not show any signs of peeling off onto the exposed photopolymer plate, or of clarifying in the non-imaged areas. The protective coating appeared to have rendered the negative impervious to the plasticizer and/or monomer exuding from the exposed photopolymer plate. After several more successive exposures no defects were observed in the negative.

EXAMPLE X

A matting solution was prepared which contained the following constituents:

| | Percent |
|---|---|
| Hexane | 94.7 |
| Formulation A | 0.2 |
| Formulation B | 0.2 |
| Formulation C | 0.4 |
| Poly(vinylpyrrolidone/vinyl acetate) (50/50 ratio by weights) | 4.5 |

The matting solution was prepared using the same procedure that is set forth in Example I.

The matting solution was coated on a dyed negative, the negative was used for exposing a photopolymer plate in a vacuum frame, and then the negative was separated from the exposed photopolymer plate, all in the manner described in Example I. The exposed photopolymer plate was processed to obtain a finished photopolymer printing plate.

The negative was in good condition and did not show any signs of peeling off onto the exposed photopolymer plate, or of clarifying in the non-imaged areas. The protective coating appeared to have rendered the negative impervious to the plasticizer and/or monomer exuding from the exposed photopolymer plate. After several more successive exposures no defects were observed in the negative. The disadvantage of this coating composition, compared to the coating composition used in Example I, is that the solvent is toxic.

EXAMPLE XI

A matting solution was prepared which contained the following constituents:

| | Percent |
|---|---|
| Cyclohexane | 94.7 |
| Formulation A | 0.2 |
| Formulation B | 0.2 |
| Formulation C | 0.4 |
| Poly(vinylpyrrolidone/vinyl acetate) (50/50 ratio by weights) | 4.5 |

The matting solution was prepared using the same procedure that is set forth in Example I.

The matting solution was coated on a dyed negative, the negative was used for exposing a photopolymer plate in a vacuum frame, and then the negative was separated from the exposed photopolymer plate, all in the manner described in Example I. The exposed photopolymer plate was processed to obtain a finished photopolymer printing plate.

The negative was in good condition and did not show signs of peeling off onto the exposed photopolymer plate, or of clarifying in the non-imaged areas. The protective coating appeared to have rendered the negative impervious to the plasticizer and/or monomer exuding from the exposed photopolymer plate. After several more successive exposures no defects were observed in the negative. The disadvantage of this coating composition, compared to the coating composition used in Example I, is that the solvent is more toxic and inflammable.

EXAMPLE XII

A matting solution was prepared which contained the following constituents:

| | Percent |
|---|---|
| Isopropyl alcohol | 94.7 |
| Formlation A | 0.2 |
| Formulation B | 0.2 |
| Formulation C | 0.4 |
| Poly(vinylpyrrolidone/vinyl acetate) (50/50 ratio by weights) | 4.5 |

The matting solution was prepared using the same procedure that is set forth in Example I.

The matting solution was coated on a dyed negative, the negative was used for exposing a photopolymer plate in a vacuum frame, and then the negative was separated from the exposed photopolymer plate, all in the manner described in Example I. The exposed photopolymer plate was processed to obtain a finished photopolymer printing plate.

The negative was in good condition and did not show any signs of peeling off onto the exposed photopolymer plate, or of clarifying in the non-imaged areas. The protective coating appeared to have rendered the negative impervious to the plasticizer and/or monomer exuding from the exposed photopolymer plate. After several more successive exposures no defects were observed in the negative.

EXAMPLE XIII

A matting solution was prepared which contained the following constituents:

| | Percent |
|---|---|
| Ethyl acetate | 94.7 |
| Formulation A | 0.2 |
| Formulation B | 0.2 |
| Formulation C | 0.4 |
| Poly(vinylpyrrolidone/vinyl acetate) (50/50 ratio by weights) | 4.5 |

The matting solution was prepared using the same procedure that is set forth in Example I.

The matting solution was coated on a dyed negative, the negative was used for exposing a photopolymer plate in a vacuum frame, and then the negative was separated from the exposed photopolymer plate, all in the manner described in Example I. The exposed photopolymer plate was processed to obtain a finished photopolymer printing plate.

The negative was in good condition and did not show signs of peeling off onto the exposed photopolymer plate. The protective coating appeared to have rendered the negative impervious to the plasticizer and/or monomer exuding from the exposed photopolymer plate. After several more successive exposures no defects were observed in the negative. The disadvantage of this coating composition, compared to the coating composition used in Example I, is that the solvent is toxic.

The protective coating can be applied to the dyed, imaged, pressure-sensitive, conversion film in any suitable manner as long as the coating is uniformly applied. The application can be accomplished by spraying, via bathing in a solution, etc.

After the protective coating is uniformly applied, the drying of said coating can be accomplished by any suitable means, e.g., a fan, atmospheric drying. The means chosen must be selected with the caution that any heat applied must not be sufficient to damage the film.

The dispersing agent used in the coating solution must be cationic. Suitable cationic dispersing agents included Formulations A, D, E and F. The composition of Formulation A, Formulation D, Formulation E, and Formulation F are provided in Example I, Example II, Example III and Example IV, respectively.

In place of the inert silica particles there may be substituted mixtures of other particles. These particles need not be transparent or translucent although such particles are preferred as the amount and distribution of the particles is not sufficient to interfere with the use of the coated or treated clear image-containing layers. Suitable particles include carbon black, titanium dioxide, barium sulfate, diatomaceous earth, magnesium carbonate, ground glass, talc, etc.

The alcohol-soluble nylons can be made by the process described in Brubaker et al. U.S. Patent No. 2,285,009.

The vinyl acetate monomer in the poly(vinylpyrrolidone co vinyl acetate) copolymer may vary from 0 to 75 parts, by weight, when that copolymer is utilized in the matting solution.

The light sources that can be used for exposing the photopolymer through the imaged, pressure-sensitive, conversion film are extensive. Since free-radical generating addition-polymerization initiators activatable by actinic radiation generally exhibit their maximum sensitivity in the ultraviolet range, the radiation source should usually furnish an effective amount of this radiation. Such sources include carbon arcs, mercury-vapor arcs, fluorescent lamps with ultraviolet radiation-emitting phosphors, argon glow lamps, electronic flash units and phtographic flood lamps. Of these, the mercury-vapor arcs are customarily used at a distance of one and one-half to 20 inches from the photopolymerizable layer. It is noted, however, that in certain circumstances it may be advantageous to expose with visible light, using a photoinitiator sensitive in the visible region of the spectrum, e.g., 9–10 phenanthrenequinone. In such cases, the radiation source should furnish an effective amount of visible radiation. Many of the radiation sources listed above furnish the required amount of visible light.

An advantage of this invention is that it allows the exposure of a photopolymer plate to an imaged, dyed, pressure-sensitive conversion film in a vacuum frame without damage being done to either surface after the plate and film subsequently have been separated. Another advantage is that the protective coating prevents damage to the imaged surface of the conversion film by plasticizer and/or monomer. Another advantage is that the protective coating prevents loss of density in conversion film due to migration of plasticizer and/or monomer from the photopolymer plate.

A further advantage is that the coating dispersion can be stored for long periods without the occurrence of agglomeration of the larger particles. A still further advantage is that the coating dispersion dries rapidly once coated. When ethyl alcohol is used, the coating dispersion is non-toxic. A still further advantage is that the protective coating allows the use of an imaged, dyed, pressure-sensitive conversion film in the preparation of finished photopolymer printing plates. The use of photopolymer printing plates has many advantages over the older-type of metal relief plates. A still further advantage of this system is that the coated layer, containing matte, does not impair the light transmission in the clear areas of the transparency during exposure of a photopolymerizable plate. Still further advantages of the matte having two vastly different sized particles is that it allows a vacuum to be maintained at the interface between the photopolymerizable plate and the coated, imaged, dyed, pressure-sensitive conversion film, and it prevents any intimate contact of the flat surfaces, thereby allowing quick release of the negative from the photopolymer plate after completion of the exposure without damage to any of the surfaces. Still other advantages will be apparent from the above description.

I claim:
1. A coating composition which comprises
    (1) a dispersion of a mixture of (a) about 0.04% to about 2.0% by weight of inert inorganic particles having a mean particle size between 8 and 20 microns, and (b) about 0.1% to about 2.0% by weight of such particles of markedly smaller size and having a mean particle size below 0.5 microns, there being about 2 to about 2.5 times by weight more small size particles than large size particles, in
    (2) a solution of a volatile solvent selected from the group consisting of an alkanol of 1–4 carbon atoms and aliphatic hydrocarbons of 5 to 10 carbon atoms, containing
    (3) an organic polymer containing a group selected from the class consisting of hydroxyl and amido groups, said polymer being a member selected from the group consisting of polyvinyl alcohol, polyvinyl pyrrolidone, poly(vinyl pyrrolidone co vinyl acetate) containing up to 75 parts by weight of vinyl acetate, alcohol-soluble polyamides, and polyamides of dimerized linoleic acid, and
    (4) a cationic alkyl quaternary ammonium salt dispersing agent wherein alkyl contains 8 to 18 carbon atoms.
2. A composition according to claim 1 wherein the particles are silica particles.
3. A composition according to claim 1 wherein said solvent is ethanol and said organic polymer is poly(vinyl pyrrolidone co vinyl acetate) containing 75% by weight of vinyl acetate.
4. A composition according to claim 1 wherein said solvent is isopropanol and said organic polymer is poly(vinylpyrrolidone co vinyl acetate) 50/50 by weight.
5. A process for improving the surface characteristics of an image-containing transparency which comprises
    (a) coating the surface of an opaque, microporous, nonfibrous clear image-bearing layer of a hydrophobic organic addition polymer of at least one ethylenically unsaturated monomer selected from the group consisting of vinyl and vinylidene monomers having a wholly carbon chain and a molecular weight of at least 10,000, with a coating composition as defined in claim 1, and
    (b) evaporating said solvent to form a matte surface protective coating on said image-bearing surface.

References Cited

UNITED STATES PATENTS 3,177,083    4/1965    De Vries.
3,223,579   12/1965    Dorland et al. _____ 117—15

ALLAN LIEBERMAN, *Primary Examiner.*

U.S. Cl. X.R.

260—18, 41, 33.6; 106—266, 287; 117—15, 138.8